United States Patent
Forkner et al.

(10) Patent No.: US 6,947,068 B2
(45) Date of Patent: *Sep. 20, 2005

(54) VIDEOCONFERENCING METHOD AND SYSTEM FOR CONNECTING A HOST WITH A PLURALITY OF PARTICIPANTS

(75) Inventors: Terry Ray Forkner, Indianapolis, IN (US); Richard Lee Melton, Greenwood, IN (US); George Thomas LaMar, Greenwood, IN (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/911,206

(22) Filed: Aug. 3, 2004

(65) Prior Publication Data

US 2005/0036030 A1 Feb. 17, 2005

Related U.S. Application Data

(63) Continuation of application No. 10/175,511, filed on Jun. 18, 2002, now Pat. No. 6,801,241, which is a continuation of application No. 09/222,592, filed on Dec. 28, 1998, now Pat. No. 6,433,813.

(51) Int. Cl.$^7$ ................................................. H04N 7/14
(52) U.S. Cl. ............................... 348/14.07; 348/14.09; 348/14.11
(58) Field of Search ........................... 348/14.01, 14.02, 348/14.03, 14.07, 14.08, 14.09, 14.1, 14.11, 14.12, 262–565, 584, 588; 379/93.21, 202.01; 370/260–266, 401, 410; 709/204; 725/143–148, 54; 715/753

(56) References Cited

U.S. PATENT DOCUMENTS

| | | | |
|---|---|---|---|
| 5,382,972 A | 1/1995 | Kannes | 348/14.07 |
| 5,473,367 A | 12/1995 | Bales et al. | 348/14.11 |
| 5,495,284 A | 2/1996 | Katz | 348/14.09 |
| 5,537,141 A | 7/1996 | Harper et al. | 725/116 |
| 5,594,491 A | 1/1997 | Hodge et al. | 725/103 |
| 5,594,732 A | 1/1997 | Bell et al. | 370/401 |
| 5,612,730 A | 3/1997 | Lewis | 725/83 |
| 5,612,733 A | 3/1997 | Flohr | 348/14.16 |
| 5,615,338 A | 3/1997 | Poole et al. | 712/223 |
| 5,623,605 A | 4/1997 | Keshav et al. | 709/236 |
| 5,659,692 A | 8/1997 | Poggio et al. | 345/756 |
| 5,671,226 A | 9/1997 | Murakami et al. | 370/474 |
| 5,674,003 A | 10/1997 | Andersen et al. | 709/228 |
| 5,724,355 A | 3/1998 | Bruno et al. | 370/401 |
| 5,748,736 A | 5/1998 | Mittra | 713/163 |
| 5,767,897 A | 6/1998 | Howell | 348/14.07 |
| 5,774,457 A | 6/1998 | Iizawa | 370/260 |
| 5,784,561 A | 7/1998 | Bruno et al. | 709/204 |
| 5,867,653 A | 2/1999 | Aras et al. | 709/204 |
| 6,433,813 B1 * | 8/2002 | Forkner et al. | 348/14.07 |
| 6,801,241 B2 * | 10/2004 | Forkner et al. | 348/14.07 |

OTHER PUBLICATIONS

"Picture Tel News Release" http://www.picturetel.com/press75.ht; (Apr. 2, 1998); 3 Pages.

(Continued)

*Primary Examiner*—George Eng
(74) *Attorney, Agent, or Firm*—Brinks Hofer Gilson & Lione

(57) ABSTRACT

An improved videoconferencing system and method are provided for connecting a host to a plurality of participants. Unlike other videoconferencing methods and systems, the videoconferencing system and method of these preferred embodiments allow each of the parties of a videoconference to benefit from the interaction between the host and the selected participant without limiting the number of participants that can join the videoconference. The host and participants can interact with the videoconferencing system by issuing voice commands or DTMF signals to a voice response unit or by using a computer to access the videoconferencing system directly or indirectly though a network such as the World Wide Web.

14 Claims, 7 Drawing Sheets

OTHER PUBLICATIONS

"Worldwide Videoconferencng Solutions" http://www.w-wvidconf.com/Solutions.htm; (May 14, 1998); 2 Pages.

"The New Web You Ain't Seen Nothing Yet!" http://techweb.cmp.com/hpc/mar96/21F_NET5.HTM; (Feb. 26, 1996); 2 Pages.

"Designing a Videoconfrencing Solution" wysiwyg://21/http://pubsys.cmp.com/nc/netdesign/video2.html; (May 14, 1998); 8 Pages.

"Videoconferencing Over the Internet Comes of Age" wysiwyg://41/http://www.zdnet.com/wsources/960617/regrev8.html; (1996); 3 Pages.

"Sectio4/4: Who's Got What; DTVC Vendors, Their Products, and Consultants" http://www.bitscout.com/faqbs4.html; (Aug. 17, 1996); 17 Pages.

Product Information: http://videoserver.com/htm/prodmenu.htm; (May 14, 1998); 13 Pages.

"Videoconferencing Through ISPs" http://www.cinecom.com/press6.htm; (Dec. 12, 1996); 2 Pages.

"A Tour of IP Network Multimedia Conferencing" http://www.videoserver.com/; (1997); 1 Page.

"What is Mbone (or IP Multicast)?" http://www.m-bone.com/mbone/what-is-mbone.htm1; (1996); 1 Page.

"Videoconferencing Calling New Networks" http://www.techweb.com/se/directlink.cgi?OEM19970110S0022; (Jan. 10, 1997); 6 Pages.

\* cited by examiner

VIDEOCONFERENCING METHOD AND SYSTEM FOR CONNECTING A HOST WITH A PLURALITY OF PARTICIPANTS

CROSS-REFERENCE TO RELATED APPLICATIONS

This application is a continuation of U.S. patent application Ser. No. 10/175,511 now U.S. Pat. No. 6,801,241, filed Jun. 18, 2002, which is a continuation of U.S. patent application Ser. No. 09/222,592, filed Dec. 28, 1998 (now U.S. Pat. No. 6,433,813), each of which is hereby incorporated by reference.

TECHNICAL FIELD

The present invention relates generally to videoconferencing services in which video and audio signals of at least one of the parties of a videoconference are transmitted to and received by at least one other party of the videoconference.

BACKGROUND

In many videoconferences, one of the parties is the "host," who is typically the center or focus of the videoconference, and the other parties are the "participants." For example, the host can be a teacher located in one classroom, and the participants can be students located in a remote classroom. Although there are several techniques that can be used to connect the host with the participants, many of these techniques limit the type of host-participant interaction and/or the number of parties that can participate in the videoconference.

In one videoconferencing technique, the video and audio signals of the host are broadcast to each of the participants This technique finds particular application in mass broadcasting, such as when a host is delivering a lecture to a large number of participants, because there is virtually no limit on the number of parties that can participate in the videoconference. Since the host does not receive video and audio signals from any of the participants, one disadvantage associated with this technique is that there is no interaction between the host and the participants. In a modified version of this technique, the host can receive video and audio signals from a selected participant. Although this modified technique allows the host to interact with one participant, the other participants to the videoconference do not receive the video and audio signals of the selected participant and are, therefore, excluded from the interaction.

To address this problem, another videoconferencing technique has been developed in which the video and audio signals of the host and each of the participants are combined and presented to each of the parties of the videoconference. For example, in a videoconference with a host and three participants, the image transmitted to each of the parties can be a four-quadrant image with the video signal of each participant shown in a respective quadrant. While this videoconferencing technique allows each party of the videoconference to interact with one another, the number of parties that can participate in the videoconference is limited to the number of parties that can be displayed in the transmitted image (four in the example given above).

There is, therefore, a need for an improved videoconferencing system and method for connecting a host with a plurality of participants.

DETAILED DESCRIPTION OF THE PRESENTLY PREFERRED EMBODIMENTS

Figure 1:
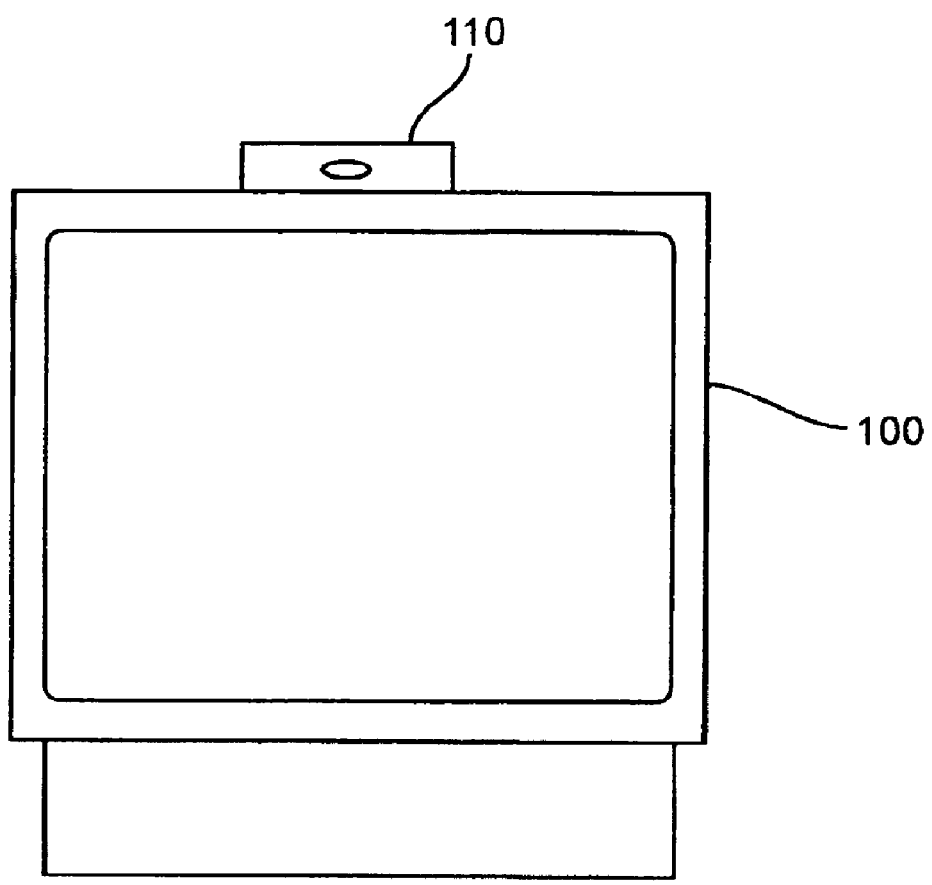
FIG. 1 is an illustration of a video terminal and camera that can be used with a presently preferred embodiment of this invention.

By way of introduction, the preferred embodiments described below include a videoconferencing system and method for connecting a host to a plurality of participants. Each of the parties of the videoconference has a video terminal 100 to receive and present video and audio signals from one or more of the other parties and has a camera 110 to transmit video and audio signals to one or more of the other parties (FIG. 1). Unlike the videoconferencing techniques described in the Background section, the videoconferencing system and method described below allow each of the parties of a videoconference to benefit from the interaction between the host and the selected participant without limiting the number of participants that can join the videoconference. The host and participants can interact with the videoconferencing system by issuing voice commands or DTMF signals to a voice response unit or by using a computer to access the videoconferencing system directly or indirectly though a network such as the World Wide Web.

Figure 2:
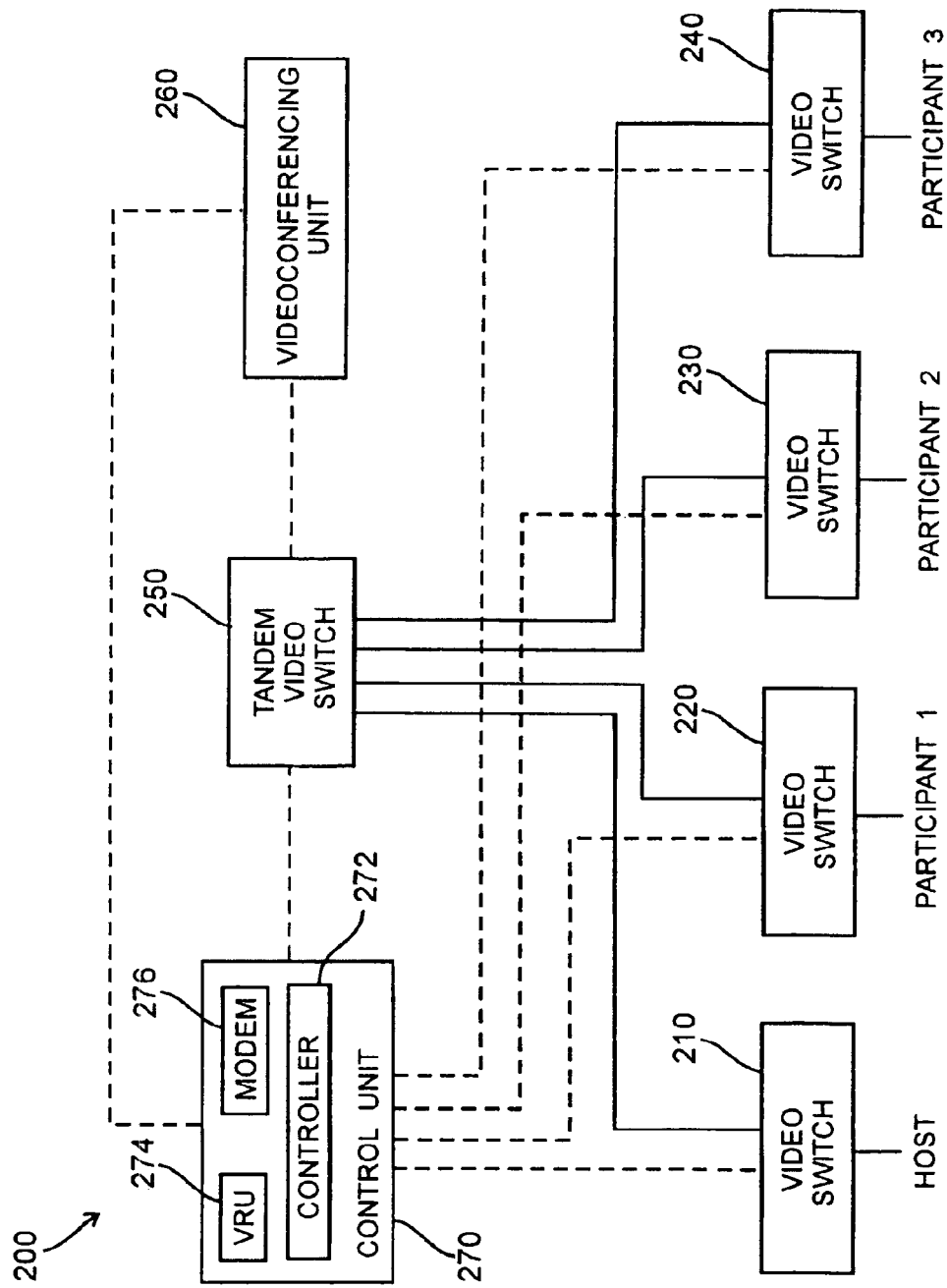
FIG. 2 is a block diagram of a videoconferencing system of a presently preferred embodiment.

Turning again to the drawings, FIG. 2 is an illustration of a videoconferencing network 200 of a presently preferred embodiment. Preferably, the videoconferencing network 200 is implemented as a public, switched, broadband video network operative to provide a full-motion videoconference. As shown in FIG. 2, this network 200 comprises video switches 210, 220, 230, 240 associated with a host and three participants (participant 1, participant 2, and participant 3), each with their own video terminal and camera for receiving and transmitting video and audio signals to the respective switches. While FIG. 2 shows each video switch being associated with a single party, a single video switch can be associated with two or more parties.

As shown by the solid connecting lines in FIG. 2, the video switches 210, 220, 230, 240 are coupled with a tandem video switch 250 to transfer video and audio signals. As used herein, the term "coupled with" means directly coupled with or indirectly coupled with through one or more components. The tandem video switch 250 transfers video and audio signals among the video switches 210, 220, 230, 240 and can also transfer audio and video signals to and from other video networks. Some or all of the components shown in FIG. 2 can be located in these other video networks. Preferably, fiber optic cabling is used to transfer the video and audio signals. Suitable video switches and tandem video switches can be purchased from Ditek.

Figure 3:
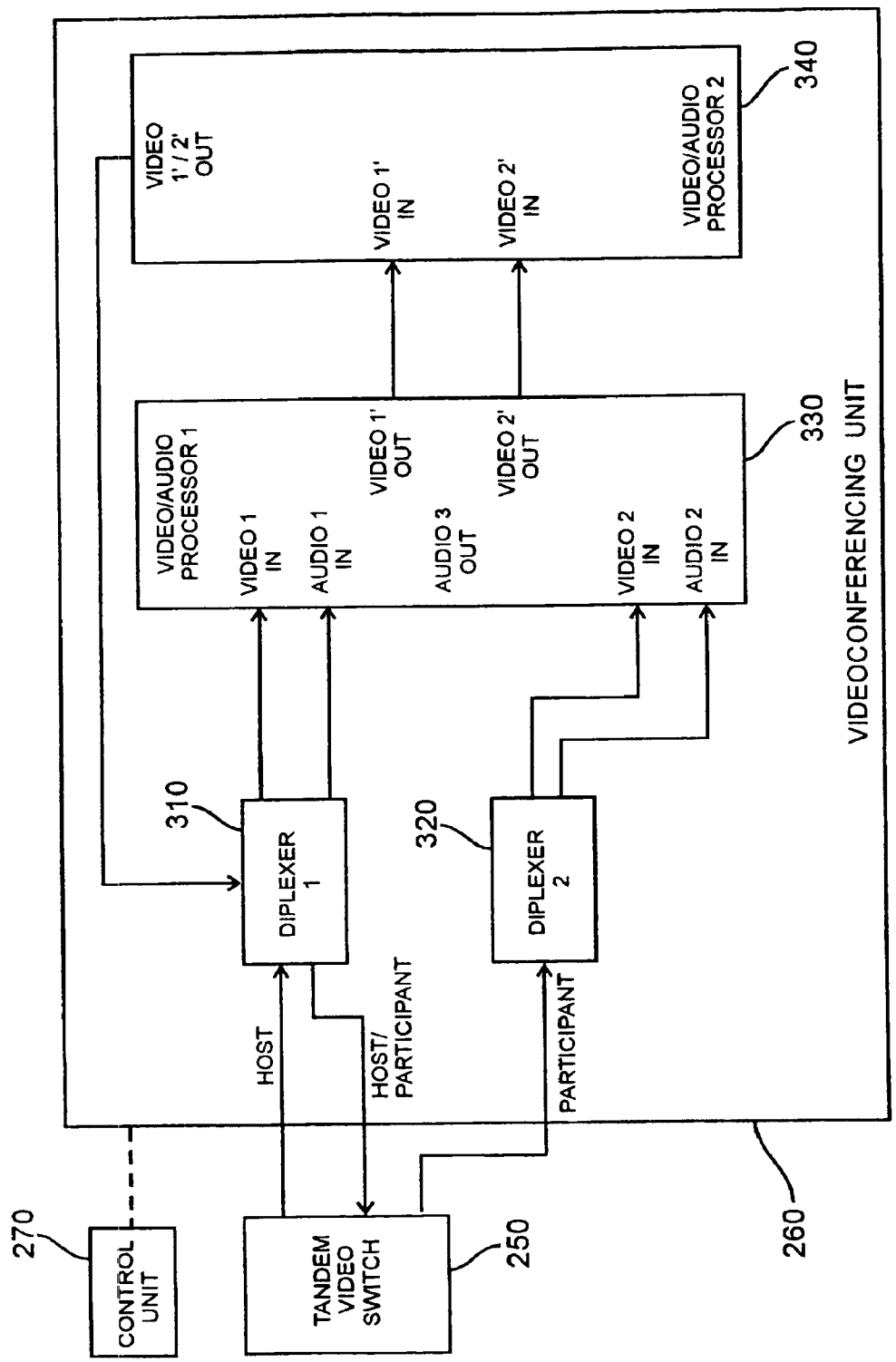
FIG. 3 is a block diagram showing a preferred implementation of a videoconferencing unit of the preferred videoconferencing system of FIG. 2.

A control unit 270 is coupled with the video switches 210, 220, 230, 240 and the tandem video switch 250 and provides these switches with control signals (shown by dashed lines). The control unit 270 comprises a controller 272 and also comprises a voice response unit 274 and modem 276 to connect the control unit 270 to an external telephone or computer, respectively. The control unit 270 directs the tandem video switch 250 to provide the videoconferencing unit 260 with video and audio signals from one or more of the parties. As shown in FIG. 3, the videoconferencing unit 260 comprises a first and second diplexer 310, 320 and a first and second video/audio processor 330, 340.

To schedule a videoconference, information identifying the host and the participants, as well as the time of the videoconference, is entered into the control unit 270. Preferably, the videoconference is scheduled by using a computer via the modem 276 of the control unit 270, although the VRU 274 of the control unit 270 can also be used. After the information is entered, the control unit 270 reserves the necessary components in the system 200 for the videoconference. At this time, the controller 272 creates a queue for listing participants who request to interact with the host, as described below.

Figure 4:
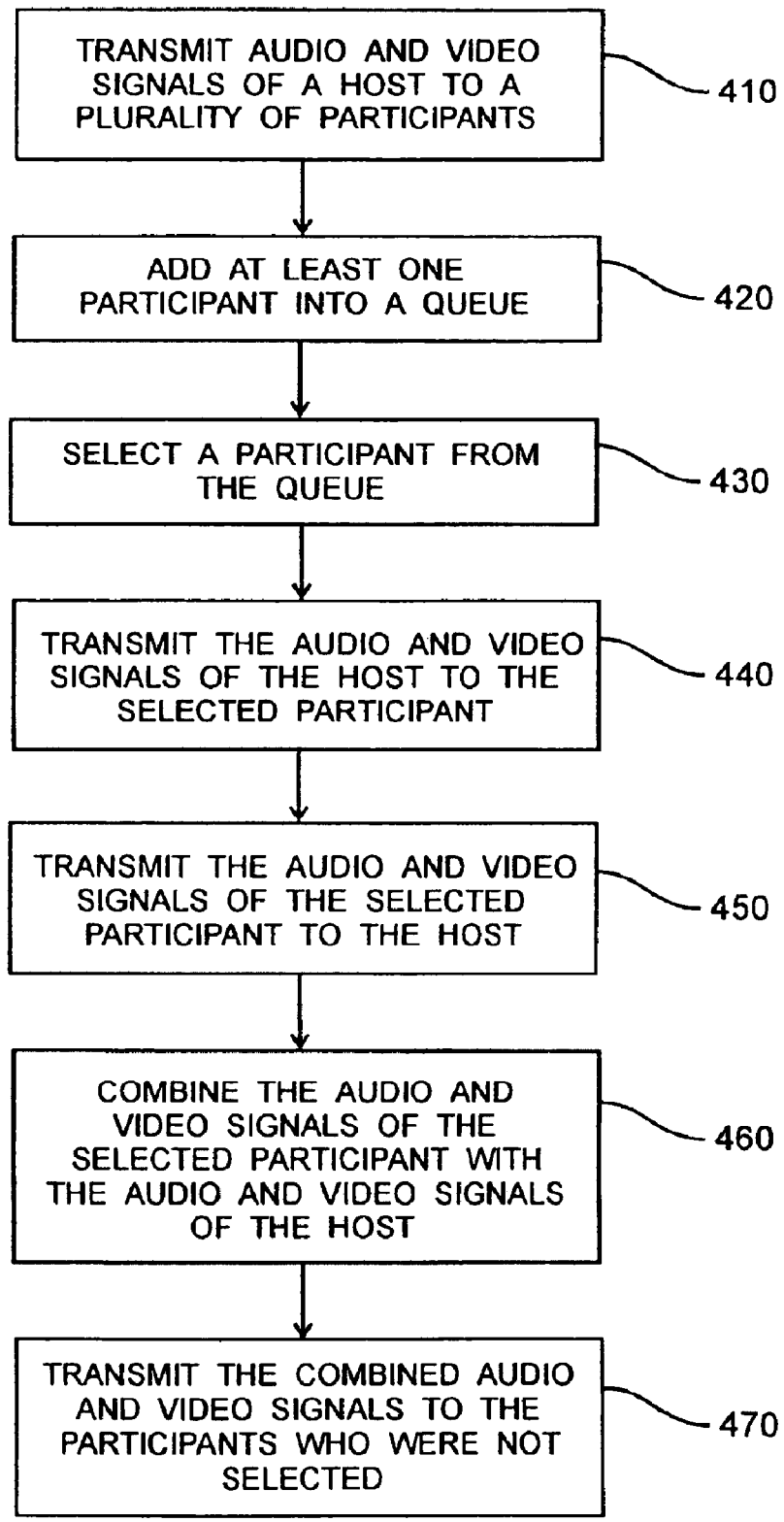
FIG. 4 is a flow chart of a preferred method for connecting a host with a plurality of participants.

FIG. 4 is a flow chart of a method of a preferred embodiment for connecting a host with a plurality of participants using the videoconferencing network of FIG. 2. As shown in FIG. 4, this method comprises transmitting audio and video signals of a host to a plurality of participants (410), adding at least one participant into a queue (420), selecting a participant from the queue (430), transmitting audio and video signals of the host to the selected participant (440), transmitting audio and video signals of the selected participant to the host (450), combining the audio and video signals of the selected participant with the audio and video signals of the host (460), and transmitting the combined audio and video signals to the participants who were not selected (470). This method will be described in detail below.

Figure 5:
FIG. 5 is an illustration of video images received by three participants in a videoconference of a preferred embodiment.

First, at the start of the videoconference, the control unit 270 directs the tandem video switch 250 and videoconferencing unit 260 to transmit video and audio signals of the host from video switch 210 to participants 1, 2, and 3 at video switches 220, 230, 240 (410). The video images transmitted to these participants is shown in FIG. 5. If a participant has a question or a response to the host's presentation, for example, the participant can contact the control unit 270 and request a connection with the host. For example, using a telephone, a participant can contact the VRU 274 of the control unit 270 and issue voice commands or DTMF signals to request a connection with the host. Alternatively, the participant can establish a computer connection to the control unit 270 via the modem 276 either directly or indirectly through a computer network such as the World Wide Web.

Figure 6:
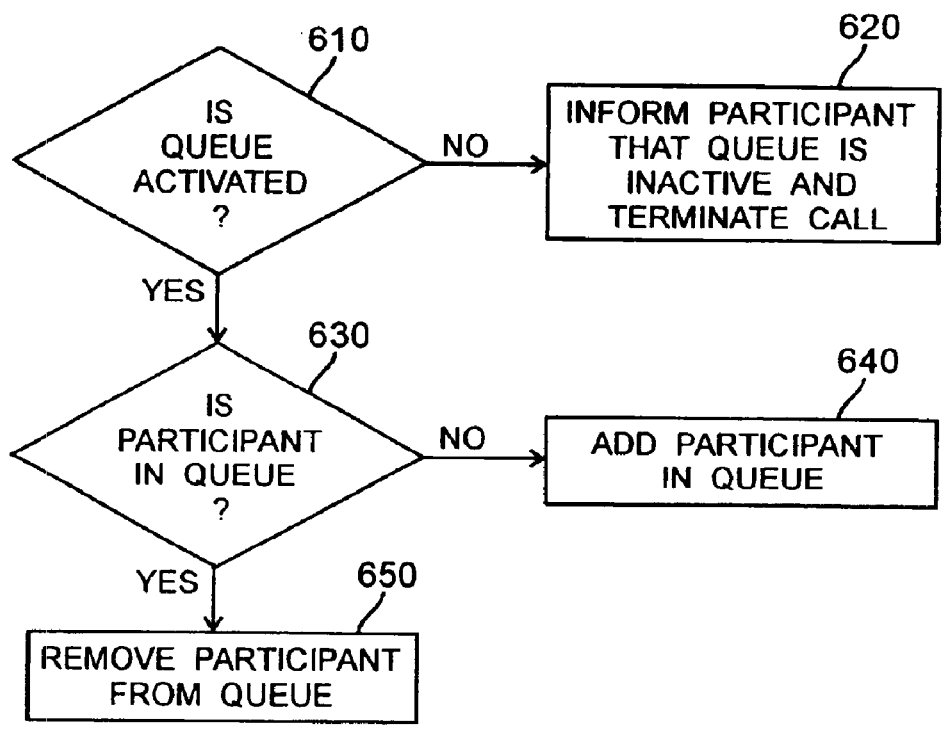
FIG. 6 is a flow chart of a preferred method for interacting with a videoconferencing control unit to add a participant to a videoconferencing queue.

FIG. 6 is a flow chart of a preferred method for interacting with the control unit 270 using the VRU 274. When a participant connects to the VRU 274, the controller 272 determines if the queue has been activated by the host (610). The host may keep the queue inactive, for example, during the lecture phase of a presentation and may activate the queue during the question-and-answer phase of a presentation. If the queue is inactive, the participant is informed that the queue is inactive, and the call is terminated (620). If the queue is active, the controller 272 next determines if the participant is currently in the queue (630). If the participant is not in the queue, the controller 272 adds the participant into the queue (420), (640). If the participant is already in the queue, the controller 272 removes the participant from the queue (650). Preferably, participants are added into the queue in a first-in-first-out ("FIFO") manner.

Figure 7:
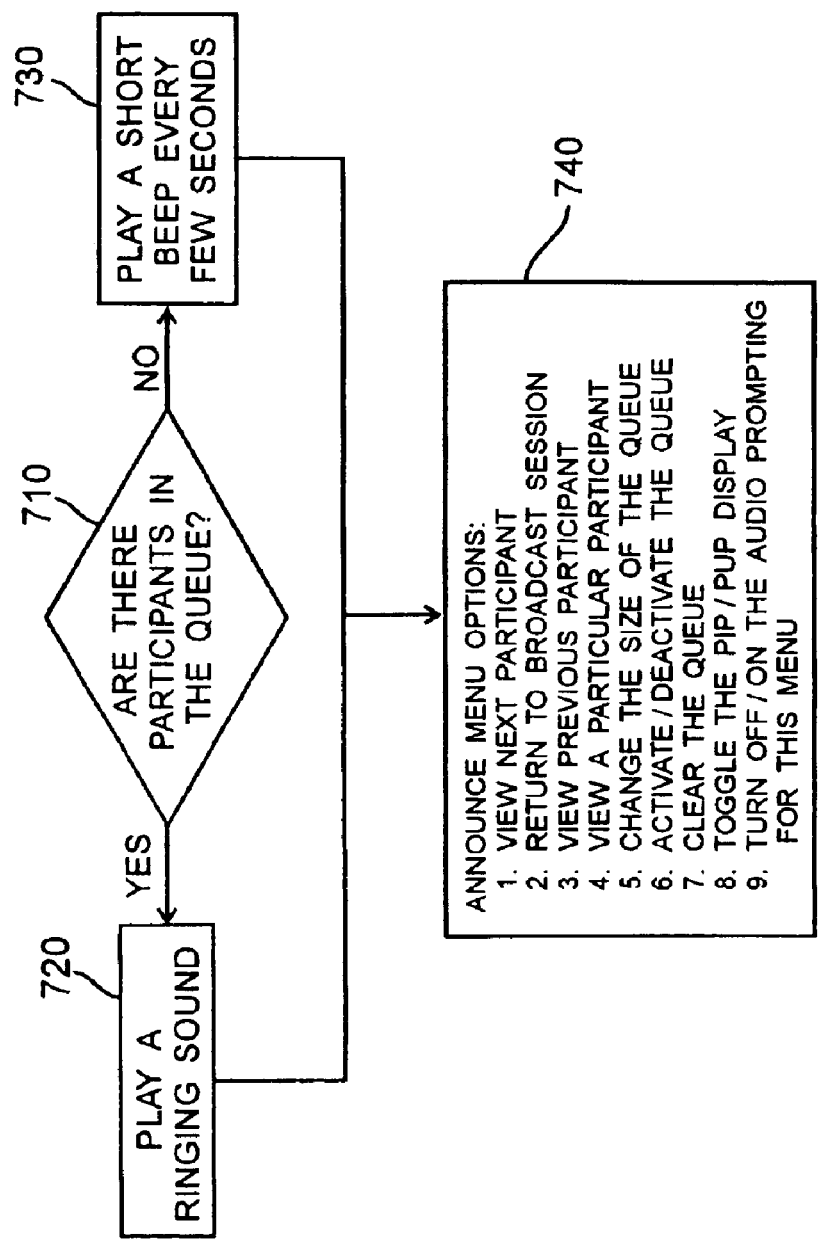
FIG. 7 is a flow chart of a preferred method for interacting with a videoconferencing control unit to select a participant from a videoconferencing queue.

Once participants have been added into the queue, the host can select a participant from the queue (430). FIG. 7 is a flow chart of a preferred method for interacting with the control unit 270 to select a participant from the queue. As shown in FIG. 7, when the host connects to the control unit 270, the controller 272 determines if there are any participants in the queue (710) and provides the host with an indication of the presence or absence of participants. For example, if there are participants in the queue, the controller 272 can instruct the VRU 274 to play a ringing sound to the host (720). If there are no participants in the queue, the controller 272 can instruct the VRU 274 to play a short beep every few seconds (730). Next, the controller 272 provides the host with a listing of options (740). In this preferred embodiment, the options include: (1) viewing the next participant, (2) returning to broadcast session, (3) viewing the previous participant, (4) viewing a particular participant, (5) changing the size of the queue, (6) activating/deactivating the queue, (7) clearing the queue, (8) toggling the PIP/PUP display, and (9) turning off/on the audio prompting listing the preceding options. The host can then select an option, such as (1) or (4) above, that connects him to one of the participants.

As described above, the video and audio signals of each party of the videoconference is sent from the tandem switch 250 to the videoconferencing unit 260. When a participant is selected, the control unit 270 instructs the videoconferencing unit 260 to return unaltered video and audio signals of the host and selected participant to the tandem video switch 250. The control unit 270 then instructs the tandem video switch 250 to transmit the video and audio signal of the host to the selected participant (440) and the video and audio signals of the selected participant to the host (450). In this way, the host and the selected participant can interact as if the videoconference were merely a point-to-point videoconference between the host and the selected participant.

The control unit 270 also instructs the videoconferencing unit 260 to combine the video and audio signals of the host and the selected participant (460). With reference again to FIG. 3, the video and audio signals of the host and the video and audio signals of the selected participant are received by the first and second diplexer 310, 320, respectively, which separates the video and audio signals for the host and the selected participant and sends the separated signals to the first video/audio processor 330. In this preferred embodiment, the first video/audio processor 330 combines the audio signals of the host and the selected participant and returns the combined audio signals to the first diplexer 310.

The first video/audio processor 330 also alters the video signals of the host and the selected participant and sends them to the second video/audio processor 340 for combination. The video signals can be combined as a picture-in-picture or picture-under-picture, or in any other suitable manner such as having the host appear on the left side of the display and the selected participant appear on the right side of the display. In operation, the first video/audio processor 330 scales the video images appropriately, and the second video/audio processor 340 combines the scaled images. For example, to combine the host and selected participant in a picture-in-picture fashion with the host in the background and selected participant in a smaller area in the foreground, the first video/audio processor 330 creates the smaller image of the selected participant, and the second video/audio processor 340 overlays the smaller image on top of the larger image of the host. The combined video signals are then returned to the first diplexer 310, which merges the combined audio signals from the first video/audio processor 330 and the combined video signals from the second video/audio processor 340. The combined signals are returned to the tandem video switch 250, which is instructed by the control unit 270 to transmit the combined audio and video signals to the participants who were not selected by the host (470).

Figure 8:
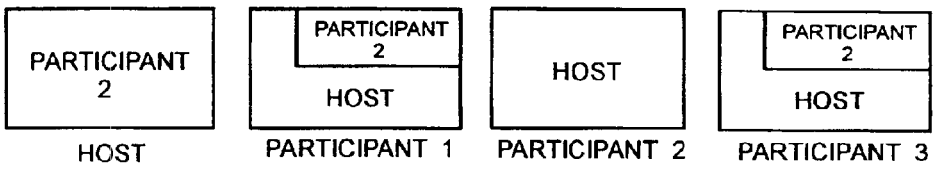
FIG. 8 is an illustration of video images received by a host and three participants in a videoconference of a preferred embodiment in which the host is interacting with the second participant.
Figure 9:
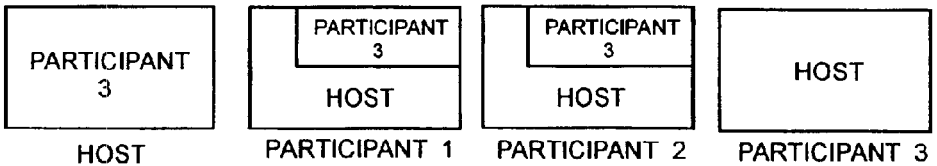
FIG. 9 is an illustration of video images received by a host and three participants in a videoconference of a preferred embodiment in which the host is interacting with the third participant.
Figure 10:
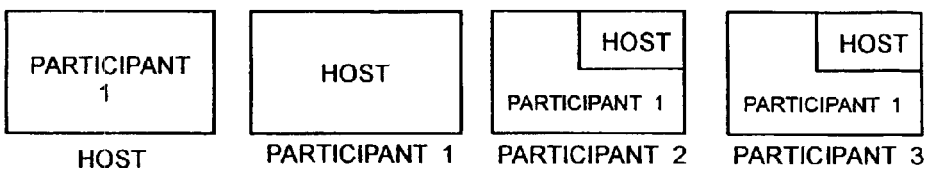
FIG. 10 is an illustration of video images received by a host and three participants in a videoconference of a preferred embodiment in which the host is interacting with the first participant.

The operation of this method will be described in conjunction with FIGS. 8–10. Assume that participants 2, 3, and 1, in that order, each request a connection to the host and are entered into the queue. When the host selects the first participant (participant 2) in the queue, the host and participant 2 will each receive the video and audio signals of the other, as shown in FIG. 8. If the videoconferencing unit 260 is instructed by the control unit 270 to combine the host and participant 2 with the host in the background and participant 2 in a smaller area in the foreground (i.e., picture-in-picture), the tandem video switch 250 sends the picture-in-picture combination of the host and participant 2 to participants 1 and 3, as shown in FIG. 8. Because the interaction between the host and the selected participant is broadcast to the other parties of the videoconference, each party can benefit from the interaction, unlike previous videoconferencing techniques. Additionally, because the video images of only the host and the selected participant are combined, the number of parties who can participate in the videoconference is not limited as in some videoconferencing techniques that require each of the parties of the videoconference to be displayed on a single screen.

An additional advantage associated with these preferred embodiments is that the host can easily navigate among the participants in the queue. For example, if participant 2 has been selected, the host can select the next participant in the queue, causing the host and participant 3 to each receive the video and audio signals of the other and causing participants 1 and 2 to receive the combined video and audio of the host and participant 3, as shown in FIG. 9. If the host then selects the previous participant in the queue, each party will receive the signals shown in FIG. 8. If the host instead selects the next participant, participant 1 is selected, as shown in FIG. 10. In FIG. 10, the combination technique used is a picture-under-picture instead of a picture-in-picture. The host can also return to broadcast mode, as shown in FIG. 5, or can select a specific participant. For example, the host can return to participant 2, as shown in FIG. 8.

There are several alternatives to the preferred embodiments described above. For example, instead of receiving and transmitting video and audio signals of each party of the videoconference, the videoconferencing unit 260 can process only those video and audio signals that are to be combined, and the video tandem switch 250 can handle the other signals. Additionally, while the above preferred embodiments have been described in conjunction with a queue, it is important to note that the host can select any participant to the video conference even if the participant is not in the queue or if the queue is inactive or not created.

For simplicity, the term "controller" is meant to broadly refer to hardware and/or software that can be used to perform the functions described above with respect to the control unit 270. For example, the controller 272 can comprise a CPU to execute a software program held in the memory of the controller 272. Of course, any appropriate software language and any appropriate hardware, analog or digital, now in existence or later developed, can be used. Additionally, the functionality described above can be implemented exclusively with hardware, or a computer-usable medium having computer readable program code embodied therein can be used. It is preferred that the controller be a RS 6000 computer.

It is intended that the foregoing detailed description be understood as an illustration of selected forms that the invention can take and not as a definition of the invention. It is only the following claims, including all equivalents, that are intended to define the scope of this invention.

What is claimed is:

1. A computer-usable medium having computer-readable program code embodied therein, the computer-readable program code executable by a processor and comprising:

first computer-readable program code operative to transmit a video signal of a host to a selected participant, wherein the selected participant does not receive its own video signal and does not receive video signals of non-selected participants, wherein the host is coupled with the selected participant and the non-selected participants;

second computer-readable program code operative to transmit a video signal of the selected participant to the host, wherein the host does not receive its own video signal and does not receive the video signals of the non-selected participants; and third computer-readable program code operative to transmit combined video signals of the host and selected participant to the non-selected participants.

2. The computer-usable medium of claim 1 further comprising:

fourth computer-readable program code operative to combine the video signals of the host and selected participant.

3. The computer-usable medium of claim 1 further comprising:

fourth computer-readable program code operative to transmit an audio signal of the host to the selected participant, wherein the selected participant does not receive its own audio signal and does not receive audio signals of non-selected participants;

fifth computer-readable program code operative to transmit an audio signal of the selected participant to the host, wherein the host does not receive its own audio signal and does not receive the audio signals of the non-selected participants; and sixth computer-readable program code operative to transmit combined audio signals of the host and selected participant to the non-selected participants.

4. The computer-usable medium of claim 1 further comprising:

fourth computer-readable program code operative to select the selected participant.

5. The computer-usable medium of claim 1, wherein the selected participant becomes a non-selected participant when the new selected participant is selected.

6. The computer-usable medium of claim 5 further comprising:

fourth computer-readable program code operative to transmit the video signal of the host to the new selected participant, wherein the new selected participant does not receive its own video signal and does not receive video signals of non-selected participants;

fifth computer-readable program code operative to transmit a video signal of the new selected participant to the host, wherein the host does not receive its own video signal and does not receive the video signals of the non-selected participants; and sixth computer-readable program code operative to transmit combined video signals of the host and new selected participant to the non-selected participants.

7. A computer-usable medium having computer-readable program code embodied therein, the computer-readable program code executable by a processor and comprising:

first computer-readable program code operative to transmit a video signal of a first party to a second party, wherein the second party does not receive its own video signal and does not receive a video signal of a third party, wherein the first party is coupled with the second party and the third party;

second computer-readable program code operative to transmit a video signal of the second party to the first party, wherein the first party does not receive its own video signal and does not receive the video signal of the third party; and third computer-readable program code operative to transmit combined video signals of the first and second parties to the third party.

8. The computer-usable medium of claim 7 further comprising:

fourth computer-readable program code operative to combine the video signals of the first and second parties.

9. The computer-usable medium of claim 7 further comprising:

fourth computer-readable program code operative to transmit an audio signal of the first party to the second party, wherein the second party does not receive its own audio signal and does not receive an audio signal of a third party;

fifth computer-readable program code operative to transmit an audio signal of the second party to the first party, wherein the first party does not receive its own audio signal and does not receive the audio signal the third party; and sixth computer-readable program code operative to transmit combined audio signals of the first and second parties to the third party.

10. The computer-usable medium of claim 7 further comprising:

fourth computer-readable program code operative to select the second party.

11. The computer-usable medium of claim 7 further comprising:

fourth computer-readable program code operative to transmit the video signal of the first party to the third party, wherein the third party does not receive its own video signal and does not receive a video signal of the second party;

fifth computer-readable program code operative to transmit the video signal of the third party to the first party, wherein the first party does not receive its own video signal and does not receive the video signal of the second party; and sixth computer-readable program code operative to transmit combined video signals of the first and third parties to the second party.

12. The computer-usable medium of claim 11, wherein the fourth, fifth, and sixth computer-readable program codes are operative to transmit in response to selecting the third party.

13. The computer-usable medium of claim 7 further comprising:

fourth computer-readable program code operative to transmit combined video signals of the first and second parties to at least one additional party.

14. The computer-usable medium of claim 7, wherein the first party comprises a host, wherein the second party comprises a selected participant, and wherein the third party comprises a non-selected participant.

* * * * *